United States Patent [19]

Lewandowski et al.

[11] 4,009,136

[45] Feb. 22, 1977

[54] MULTICOLOR COATING COMPOSITIONS

[75] Inventors: Edward W. Lewandowski, Ottsville, Pa.; Frank Koebert, Normandy, Mo.

[73] Assignee: Rohm and Haas Company, Philadelphia, Pa.

[22] Filed: June 5, 1974

[21] Appl. No.: 476,508

[52] U.S. Cl. .............. 260/29.6 RB; 260/29.6 RW; 260/29.6 WB; 260/29.7 UA; 260/29.7 W
[51] Int. Cl.$^2$ .................................... C08L 29/14
[58] Field of Search ..... 260/34.2, 29.6 R, 29.6 PM, 260/29.6 E, 29.6 H, 29.6 ME, 29.6 MH, 29.6 RB, 29.6 RW, 29.6 WB, 29.7 UA, 29.7 W

[56] References Cited
UNITED STATES PATENTS

| | | | |
|---|---|---|---|
| 2,443,893 | 6/1948 | Collins | 260/29.6 PM |
| 2,455,402 | 12/1948 | Bromley | 260/34.2 |
| 2,601,315 | 6/1952 | Morrison | 260/34.2 |
| 2,795,562 | 6/1957 | Jud | 260/29.2 UA |
| 2,964,417 | 12/1960 | Ward | 260/34.2 |
| 3,038,869 | 6/1962 | Hilliard | 260/42.14 |
| 3,058,931 | 10/1962 | Petty | 260/29.6 R |
| 3,138,568 | 6/1964 | Sears | 260/29.7 UA |
| 3,185,653 | 5/1965 | Knudsen | 260/29.6 R |
| 3,298,986 | 1/1967 | Ray | 260/29.6 PM |
| 3,772,236 | 11/1973 | Soons | 260/29.6 RB |

Primary Examiner—Paul R. Michl

[57] ABSTRACT

A process for preparing a multicolor coating composition where (a) a polymeric material is dissolved in an organic solvent to form a viscous solution, (b) the viscous solution is mixed with an oil-based pigment grind, (c) the viscosity of the mix is increased by addition of an aqueous polymer latex to the mix, (d) addition of the resulting mixture to an aqueous latex-based paint with agitation produces a coarse dispersion of the pigmented latex modified polymer solution in the latex-based paint. The composition created by this process is suitable for application to solid surfaces by brushing, rolling or spraying. A spotted color effect is created as the pigmented globules created by the process are not broken by the shearing action of brushing or rolling.

12 Claims, No Drawings

MULTICOLOR COATING COMPOSITIONS

The present invention relates to multicolor coating compositions and the methods for preparing such compositions. More particularly, the invention is concerned with a composition having a coarse dispersion of a pigmented latex-modified polymer solution in a latex-based paint. The resulting composition contains pigmented globules dispersed in a background paint and the composition can be brushed, rolled or sprayed onto a solid surface without rupture of the globules to produce a spotted color effect.

Multicolor coating compositions are well known in the art and the compositions of U.S. Pat. Nos. 2,591,904 and 3,458,328 issued to Zola, as well as U.S. Pat. Nos. 3,138,568 and 3,185,653 being representative of the more successful formulations. The major problem with many of these compositions is that while they can be successfully sprayed, they often fail to produce the multicolor effect upon rolling or brushing, because the pigmented globules suspended in the background paint are sheared, with resultant undesirable effects such as severe elongation of the globules, break up and intimate mixing of pigmented globules with base paint, and even coalescence of sheared globules over the surface of the background paint.

While some of the compositions cited supra are claimed to be brushable or rollable, practical studies have shown that the typical untrained homeowner, with little or no paint experience would not be able to produce the desired multicolor effect by brushing or rolling, and that to do so requires skill, experience and special equipment. One composition, specifically geared for use by a typical homeowner was found to be brushable and rollable, but the preparation of an esthetically appealing panel was found to be quite difficult. However, the present invention solves this problem with its unique formulation which provides for a multicolor coating composition that can be sprayed, brushed or rolled onto a solid surface without encountering the problems heretofore experienced by those with little or no skill in the application of multicolor paints.

The present invention involves the following steps in the preparation process: (a) forming a viscous solution of a polymeric material dissolved in an organic solvent, (b) mixing the resulting viscous solution with an oil-based pigment grind, (c) increasing the viscosity of the mix by adding an aqueous polymer latex to the mix, and (d) adding the final pigmented mixture to an aqueous latex-base paint with controlled agitation to effect a coarse dispersion of pigmented latex modified polymer solution in the background latex paint.

It is believed that the unique ability of the present composition to be coatable by brushing or rolling without the adverse effects of shearing on the pigmented globules is due to the unexpected synergistic properties of the materials used to create the compositions. A preferred formulation is made by mixing a polyvinyl acetal resin such as polyvinyl butyral with a substantially water immiscible solvent such as tributyl phosphate. A pigment is then ground in a solution grade of polymeric acrylic resin and an organic solvent, such as xylol, and the two resulting mixtures are blended. The total mixture is then blended with an aqueous latex-based emulsion with stirring so as to control the size of the pigmented globules formed by this step. The key to this invention resides in the formation of the pigmented globules. It is believed that a portion of the water immiscible solvents, i.e., xylol and especially the tributyl phosphate, are transferred from the solution with polyvinyl butyral, pigment, and polymeric acrylic resin to the latex emulsion with a concomitant increase in the viscosity of the polyvinyl butyral solution, which results in the formation of pigmented droplets of a limited size that are less easily deformed by shear. At a further step, when the total pigmented solution is added to a background latex paint, still more tributyl phosphate transfer is believed to occur with a further increase in globule or droplet viscosity and thus resistance to brush or roller shear.

This is a particularly unexpected result in light of the teachings of the Knudsen patent, U.S. Pat. No. 3,185,653 wherein it is taught that transfer of the solvent from the pigmented phase globules to the aqueous phase is to be avoided, otherwise the pigmented globules become hardened at the surface and become unusable. Knudsen avoids this solvent transfer by emulgating the solvent with the aqueous phase as well as using it in the dispersed phase. The present invention, it is believed, practices that which Knudsen points out should be avoided, by virtue of the postulated solvent migration to the aqueous latex phase. While the physical evidence tends to support the solvent migration theory, it is not meant to limit the invention to this or other hypotheses or theories which may be mentioned herein.

The polymeric binder material that is employed to create the pigmented dispersed phase may be polymers of monomers such as vinyl acetate, vinylidine chloride, styrene, vinyl toluene, acrylonitrile, methacrylonitrile, acrylic and methacrylic acid esters of vinyl and aliphatic alcohols, polyvinyl acetal resins, and so forth. It has been noted that the polyvinyl acetal resins are of particular value in creating the essentially non-shearable pigmented globules of this invention. The aforementioned resins include polyvinyl butyral and polyvinyl formal, which are acetals of polyvinyl alcohol, which is formed by hydrolysis of polyvinyl acetate. Because of the method of preparation, the final polymer contains three different functional groups distributed along the molecular chain, and may be considered a terpolymer. The polyvinyl acetals are hydroplastic and insoluble in water, with insolubility increasing as butyral and formal groups are substituted for acetate groups. While several grades of polyvinyl acetal resins are avialable, molecular weight is an important factor in the formulation of the present invention. Polyvinyl butyral resins having a molecular weight range of 30,000 to 1,000,000 are useful, those with a range of 100,000 to 300,000 being more preferred and a range of 180,000 to 270,000 being most preferred. The solvent/coalescent for the binder of the pigmented phase is also a prime factor in this invention. The basic consideration is that the solvent/coalescent be one which is a good solvent for the binder, substantially insoluble in water and yet compatable with the volatile organic solvent used in the pigment phase. The solvent/coalescent which may be used with the polymeric binder of the pigmented phase include the following: dimethyl, adipate, diisobutyl adipate, bis(2-ethylhexyl)azelate, diethylene glycol dibenzoate, tributyl citrate, epoxy stearates, butyl phthalate, butyl glycollate, triethyl phosphate, tricresyl phosphate, tributyl phosphate, triphenyl phosphate, tri-n-hexyl phosphate, diethyl phthalate, dimethyl phthalate, butyl cyclohexyl phthalate, dibutyl phthalate, dicyclohexyl phthalate, dibutyl sebacate, butyl stearate, ricinoleic acid esters, polyethylene glycol ether, glyceryl monooleate, pelargonic acid esters, furfuryl oleate, complex linear polyesters, and the like.

The pigment phase binder and its solvent/coalescent are mixed in such proportions as to obtain a solution having a viscosity of from about 500 to about 50,000 centipoise with a preferred range of 3,000 to about 10,000 centipoise as measured on a Brookfield Synchro-Lectric Viscometer Model LVF with a No. 4 spindle at a speed of 30 rpm at 25° C. This solution is the basis for the pigmented phase of the final multicolor composition.

As coloring agents for the pigment phase, any of the organic or inorganic pigments, or combinations thereof, normally employed for providing desired shades and tones in non-aqueous conventional coating compositions can be used. Useful pigments are: titanium dioxide, carbon or lamp black, phthalocyanine blue, chrome green, phthalocyanine green, cadmium red, molybdate orange, chrome yellow, alizarine maroon, oxide yellow, oxide red, oxide brown, gold or bronze powders, aluminum powders and particles, and so forth. The pigments are conveniently ground in a medium that is compatible with the pigment phase binder, solvent/coalescent and a volatile organic solvent. The grind medium may be an oil, such as linseed or castor, an alkyd resin, polymers of an ester of acrylic or methacrylic acid and the like. Optionally, olefinically unsaturated copolymerizable monomers can be used with the grind medium in amounts of up to 50% or more. Examples of such monomers include: vinyl aromatics such as styrene and vinyl toluene, vinyl chloride, vinyl acetate, nitriles such as acrylonitrile, methyl acrylate, tetradecyl acrylate, pentadecyl acrylate, t-butyl acrylate, butyl methacrylate, pentadecyl methacrylate and so forth.

The pigment and its grind medium are fluidized in an organic solvent that should be compatible with the solvent/coalescent and may be compatible with the pigment phase binder. The acceptable solvents can be selected from any of the known solvent clases such as aliphatic and aromatic hydrocarbons, halogenated hydrocarbons, ethers, esters, alcohols, aldehydes, acetones, heterocyclic solvents and so forth.

The fluidized pigment grind is then blended with the pigment binder and solvent/coalescent solution to form the pigmented globule phase of the final multicolor composition. The amount of pigment solution and binder solution may be varied to produce the desired color intensity, with 1% to about 25% of the final pigmented phase being the fluidized pigment grind. It is also possible to omit the pigment altogether to produce a clear phase. Into this pigmented mixture an aqueous polymer latex is added with low shear. By controlling the degree of shear or the amount of latex added, the size of the colored particles is controlled. Since the solvent mix of the pigment phase is incompatible with the aqueous latex, the pigment mix-latex blend is a paste containing pigmented particles whose size may be decreased by the addition of more latex.

The polymer latex may be any of the well-known latices such as emulsion polymers of vinyl acetate, styrene, styrene-butadiene, vinyl acetate-vinyl chloride, acrylonitrile-butadiene, butadiene, isoprene, vinylidene chlorideacrylonitrile, vinylidene chloride-vinyl acetate, vinyl chloride-acrylonitrile, acrylic acid esters and methacrylic acid ester polymers and copolymers thereof with other vinyl monomers, carboxylated synthetic and natural rubbers, and so forth. The various latices will undoubtedly produce varying results, however, the typical latex emulsion will yield the desired final product.

The final multicolor composition is formed by adding one or more pigmented phases as described supra to a background latex base with slow agitation. The background latex base itself may be pigmented to provide a final composition having one or more different colors on a colored base. The agitation may influence the size of the particles in the final composition, with high shear causing reduction of the size of the particles. Again, any of the latex emulsions discussed earlier may be used as the background latex base.

The final composition can be applied to any surface that is properly prepared for application of a latex-based paint. The unique property of this composition, which allows application by rolling, brushing or spraying without loss of the desired multicolor effects, makes it possible for a person of ordinary painting ability to apply this composition in the same way as such a person would apply any other latexbased paint. Application of this composition by industrial machine coating techniques such as by roll coating or curtain coating is readily accomplished by machine operators of ordinary skill.

The following Examples more clearly illustrate the method of preparation of the present invention. Various changes and modifications in the multicolor coating compositions, preparatory procedures, and modes of utilization will occur to those skilled in the art. It is to be understood that where such changes and modifications are embraced by the hereafter appended claims, they constitute part of this invention.

EXAMPLE I

Blend A: A solution is made of polyvinyl butyral resin (Monsanto Butvar B-72A) in tributyl phosphate.

|  | Parts By Weight |
| --- | --- |
| Butvar B-72A | 10.00 |
| Tributyl Phosphate | 90.00 |
|  | 100.00 |

The viscosity of this solution is about 7,000 centipoise when measured on a Brookfield Synchro-Lectric Model LVF Viscometer at 25° C. with a No. 4 spindle at 30 RPM.

| Blend B: | Parts By Weight |
| --- | --- |
| Violet R | 0.50 |
| Orange R | 6.50 |
| 50% solution of a copolymer resin of 75% methyl methacrylate/20% butyl methacrylate/5%-N-substituted amino alkyl methacrylate in toluene/xylene | 50.00 |
| Xylene | 43.00 |
|  | 100.00 |

The pigments are ground in the resin solution and the resulting mixture fluidized by addition of the xylene. Blend A and Blend B are mixed together.

|  | Parts By Weight |
|---|---|
| Blend A | 90.00 |
| Blend B | 10.00 |
|  | 100.00 |

Blend C: To the mixture of Blend A and Blend B, is added with slow agitation, a latex emulsion of polymeric acrylic resin, such as a 66% ethyl acrylate/34% methyl methacrylate copolymer aqueous emulsion.

|  |  | Parts By Weight |
|---|---|---|
| Blend A | 90.00 premix | 90.00 |
| Blend B | 10.00 |  |
| Aqueous Copolymer Latex |  | 10.00 |
|  |  | 100.00 |

As this mixture is a paste, the addition of more latex emulsion will provide a more workable mixture.
Blend D: The final composition is then formed by adding the red colored "C" blend to a white-based paint.

|  | Parts By Weight |
|---|---|
| Blend C | 30.00 |
| White Latex-based Paint | 70.00 |
|  | 100.00 |

The result is a latex-based paint of excellent stability during storage, which can be applied to a surfaced prepared for painting by rolling, brushing or spraying. The film has a white color base on which are scattered a great number of red particles which have not been blended by the shearing action of rolling or brushing.

EXAMPLE 2

Blend A: A solution is made of polyvinyl butyral resin (Monsanto Butvar B-73) in tributyl phosphate.

|  | Parts By Weight |
|---|---|
| Butvar B-73 | 15.00 |
| Tributyl Phosphate | 85.00 |
|  | 100.00 |

The viscosity of this solution is about 9,000 centipoise when measured on a Brookfield Viscometer as in Example 1.

| Blend B: | Parts By Weight |
|---|---|
| Carbon Black | 7.00 |
| 50% solution of a copolymer resin of 75% methyl methacrylate/25% butyl methacrylate in toluene/xylene | 40.00 |
| Xylene | 53.00 |
|  | 100.00 |

Blend A and Blend B are mixed together.

|  | Parts By Weight |
|---|---|
| Blend A | 90.00 |
| Blend B | 10.00 |
|  | 100.00 |

Blend C: To the mixture of Blend A and Blend B is added, with slow agitation, a latex emulsion of polymeric acrylic resin, such as a 66% ethyl acrylate/34% methyl methacrylate copolymer aqueous emulsion.

|  |  | Parts By Weight |
|---|---|---|
| Blend A | 90.00 premix | 90.00 |
| Blend B | 10.00 |  |
| Aqueous Copolymer Latex |  | 10.00 |
|  |  | 100.00 |

As this mixture is a paste, the addition of more latex emulsion will provide a more workable mixture.
Blend D: The final composition is then formed by adding the black colored C blend to a yellow latex-based paint.

|  | Parts By Weight |
|---|---|
| Blend C | 20.00 |
| Yellow Latex-based Paint | 80.00 |
|  | 100.00 |

The result in this Example is as in Example 1, but the color effect is one of black particles on a yellow background.

EXAMPLE 3

Blend A: A solution is made of a polyacrylic resin in tributyl phosphate.

|  | Parts By Weight |
|---|---|
| Resin of 70% methyl methacrylate/30% ethyl acrylate in xylene | 15.00 |
| Tributyl Phosphate | 85.00 |
|  | 100.00 |

The viscosity of this solution is 3,600 centipoise when measured on a Brookfield Viscometer as in Example 1.

| Blend B: | Parts By Weight |
|---|---|
| Titanium dioxide | 37.00 |
| 50% solution of copolymer resin of 75% methyl methacrylate/25% butyl methacrylate in toluene/xylene | 20.00 |
| Xylene | 43.00 |
|  | 100.00 |

The pigment is ground in the resin solution and the resulting mixture fluidized by addition of the xylene. Blend A and Blend B are mixed together.

|  | Parts By Weight |
|---|---|
| Blend A | 90.00 |
| Blend B | 10.00 |
|  | 100.00 |

Blend C: To the mixture of Blend A and Blend B, is added with slow agitation, a latex emulsion of polymeric acrylic resin, such as a 30% 2-ethylhexyl acrylate/70% styrene copolymer aqueous emulsion.

|  | Parts By Weight |
|---|---|
| Blend A 90.00 premix | 90.00 |
| Blend B 10.00 |  |
| Aqueous Copolymer Latex | 10.00 |
|  | 100.00 |

More latex is added to provide a workable pigmented mixture.

Blend D: The final composition is then formed by adding the white colored C blend to a blue latex-based paint.

|  | Parts By Weight |
|---|---|
| Blend C | 35.00 |
| Blue Latex-based Paint | 65.00 |
|  | 100.00 |

The result in this Example is as in Example 1, but the color effect is one of white particles on a blue background.

EXAMPLE 4

Blend A: A solution is made of polyvinyl formal resin (Monsanto Formvar 12/85) in tributyl phosphate.

|  | Parts By Weight |
|---|---|
| Formvar 12/85 | 18.00 |
| Tributyl Phosphate | 82.00 |
|  | 100.00 |

The viscosity of this solution is about 5,000 centipoise when measured on a Brookfield Viscometer as in Example 1.

| Blend B: | Parts By Weight |
|---|---|
| 1. Blue | 7.00 |
| phthalocyanine blue |  |
| 50% copolymer resin | 50.00 |
| solution of Example 1 |  |
| Xylene | 43.00 |
|  | 100.00 |
| 2. Green | 7.00 |
| phthalocyanine green |  |
| 50% copolymer resin | 50.00 |
| solution of Example 1 |  |
| Xylene | 43.00 |
|  | 100.00 |

The pigments are ground in the resin solution and the resulting mixtures fluidized by addition of the xylene.

The blue Blend B is mixed with Blend A and the green Blend B is mixed with Blend A.

|  | Parts By Weight |
|---|---|
| Blend A | 90.00 |
| Blend B | 10.00 |
|  | 100.00 |

Blend C: To blue Blend C and to green Blend C is added, with slow agitation, a latex emulsion of polymeric acylic resin, such as a 45% butyl acrylate/55% methyl methacrylate copolymer aqueous emulsion.

|  | Parts By Weight |
|---|---|
| Blend A 90.00 premix | 90.00 |
| Blend B 10.00 |  |
| Aqueous Copolymer Latex | 10.00 |
|  | 100.00 |

More latex is added to provide a workable pigment mixture.

Blend D: The final composition is then formed by adding the green colored D blend and the blue colored D blend to a yellow latex-based paint.

|  | Parts By Weight |
|---|---|
| Green Blend D | 20.00 |
| Blue Blend D | 20.00 |
| Yellow Latex-based Paint | 60.00 |
|  | 100.00 |

The result in this Example is as in Example 1, but the color effect is one of green and blue particles on a yellow background.

We claim:

1. A process for the preparation of a sprayable, brushable, and rollable multicolor coating composition consisting essentially of the steps of a) forming a viscous solution of a pigmented polyvinyl acetal resin dissolved in an organic solvent, and b) adding one or more of said solutions with controlled agitation to an aqueous polymer latex, whereby solvent migration from the mix to the latex causes an increase in viscosity of the mix thereby forming pigmented shear resistant droplets or globules in the latex.

2. The process of claim 1 where the latex forms a background paint in which the pigmented droplets or globules are dispersed, and which itself is pigmented to yield a composition having one or more different colors on a colored base.

3. The process of claim 1 in which the polyvinyl acetal resin is a polyvinyl butyral resin.

4. The process of claim 3 in which the polyvinyl butyral resin has a weight average molecular weight preferably between 100,000 and 300,000 and is in a solution having a viscosity between 30 and 100 poises.

5. The process of claim 3 in which the viscosity of the polyvinyl butyral resin solution is between 5 and 500 poises, and the polyvinyl butyral resin has a weight average molecular weight of between 30,000 and 1,000,000.

6. The process of claim 1 in which an oil-based pigment grind containing a polymer or a copolymer of at least one of the esters selected from the group consisting of acrylic acid esters and methacrylic acid esters optionally with up to 50% or more other olefinically unsaturated addition polymerizable comonomers is used to pigment the polyvinyl acetal resin solution.

7. The process of claim 1 in which the aqueous polymer latex is a polymer emulsion produced by addition polymerization.

8. The process of claim 1 in which the organic solvent is a substantially water-insoluble, low volatility member selected from the group consisting of esters of organic and inorganic acids, ethers and polyethers, mono and polyhydric alcohols, and aromatic hydrocarbons.

9. A process for the preparation of a multicolor coating composition comprising the step of (a) forming a solution of a polyvinyl butyral resin having a weight average molecular weight between 30,000 and 1,000,000, in an organic solvent, said solution having a viscosity between 5 and 500 poises, (b) mixing said resin solution with a pigment ground in a medium comprising a solvent and a polymer or copolymer of at least one of the esters selected from the group consisting of acrylic acid esters, and methacrylic acid esters, (c) adding one or more of said mixtures to an aqueous latex based paint while controlling the agitation to effect a coarse dispersion of the pigmented polyvinyl butyral solution in the latex based paint thereby forming a composition which is suited to application to solid surfaces by brushing, rolling or spraying to produce a coating with a spotted color effect.

10. The composition prepared by the process of claim 9.

11. A process for the preparation of a multicolor coating composition comprising the steps of (a) forming a solution of about 10 parts polyvinyl butyral resin having a weight average molecular weight between 180,000 and 270,000 in about ninety parts by weight of tributyl phosphate, said solution having a viscosity between 30 and 100 poises (b) mixing said resin solution with a pigment grind containing about seven parts dry ground colorant, fifty parts of a copolymer of acrylic acid esters or methacrylic acid esters, up to about 10% of which esters are N-substituted amino alkyl acrylate or methacrylate, having a glass temperature of about 82° C. and about forty-three parts of xylene, (c) increasing the viscosity of said mix by adding it to a colored aqueous latex paint comprising an emulsion polymer of butyl acrylate, ethyl acrylate, methyl methacrylate and methacrylic acid to thereby form a dispersion of pigmented resin droplets or globules in a latex paint suited to application to solid surfaces by brushing, rolling or spraying.

12. The composition prepared by the process of claim 11.

* * * * *